United States Patent
Elford

(10) Patent No.: US 6,571,507 B2
(45) Date of Patent: Jun. 3, 2003

(54) FISHING ROD HOLDERS

(76) Inventor: David Donovan Elford, 9871 Parsons Road, Richmond British Columbia (CA), V7E 1K8

( * ) Notice: Subject to any disclaimer, the term of this patent is extended or adjusted under 35 U.S.C. 154(b) by 0 days.

(21) Appl. No.: 09/934,589

(22) Filed: Aug. 23, 2001

(65) Prior Publication Data

US 2002/0023379 A1 Feb. 28, 2002

(51) Int. Cl.7 .............................................. A01K 97/10
(52) U.S. Cl. ...................................... 43/21.2; 248/511
(58) Field of Search ...................... 43/21.2, 22; 42/94; 248/511, 514, 518–521, 523, 525–526, 536, 540, 316.5, 228.5, 538–539; 403/75, 58, 205, 53, 161, 164, 15; 211/60.1, 120, 70.7

(56) References Cited

U.S. PATENT DOCUMENTS

| | | | | | |
|---|---|---|---|---|---|
| 1,760,592 A | * | 5/1930 | Gift | ....................... | 24/132 R |
| 2,682,127 A | * | 6/1954 | Binder | ....................... | 24/489 |
| 3,564,751 A | * | 2/1971 | Holiman | ....................... | 43/21.2 |
| 3,792,829 A | * | 2/1974 | Fickett | ....................... | 248/229.15 |
| 3,935,657 A | * | 2/1976 | Wade | ....................... | 42/94 |
| 4,294,364 A | * | 10/1981 | Bilbrey | ....................... | 211/182 |
| 4,635,390 A | * | 1/1987 | Walters | ....................... | 248/538 |
| 4,972,619 A | * | 11/1990 | Eckert | ....................... | 42/94 |
| 5,417,398 A | * | 5/1995 | Schilling | ....................... | 24/495 |
| 5,797,212 A | * | 8/1998 | Kistner et al. | ....................... | 224/922 |

FOREIGN PATENT DOCUMENTS

JP           06030683 A  *  2/1994  ................. 43/21.2

* cited by examiner

Primary Examiner—Charles T. Jordan
Assistant Examiner—Tara M Golba

(57) ABSTRACT

A fishing rod holder has an elongate upwardly open fishing rod receptacle with upwardly divergent opposite sides, a pair of elongate fishing rod retainers on the fishing rod receptacle, the fishing rod retainers extending side-by-side along the fishing rod receptacle and forming therewith an elongate passage for accommodating a portion of a fishing rod in a first position of the fishing rod retainers, and pivot connections at one end of the fishing rod receptacle at the opposite sides of the fishing rod receptacle and respective ends of the fishing rod retainers, the pivot connections having pivot axes which converge upwardly and inwardly of the opposite sides.

9 Claims, 5 Drawing Sheets

FISHING ROD HOLDERS

BACKGROUND OF THE INVENTION

1. Field of the Invention

The present invention relates to fishing rod holders and is useful, in particular, for holders for supporting fishing rods on the sides or the sterns of fishing boats.

2. Description of the Related Art

It is known to provide a fishing rod holder on a boat for supporting a fishing rod while the user is fishing. However, prior art fishing rod holders have the disadvantage that they do not enable a fishing rod to be disengaged from its fishing rod holder in a gentle and convenient manner. This is particularly a problem when it is desirable to effect easy removal of the fishing rod from its holder while the rod is being subjected to a heavy load, for example the pull of a hooked fish.

BRIEF SUMMARY OF THE INVENTION

It is accordingly an object of the present invention to provide a novel and improved fishing rod holder which facilitates ready releasability of a fishing rod from the holder when required.

BRIEF SUMMARY OF THE INVENTION

According to one aspect of the present invention, a fishing rod holder comprises an upwardly open rod receptacle mounted on a support with a pair of rod retainers on the rod receptacle. Pivot connections between the rod retainers and the rod receptacle allow pivotation of the rod retainers between first, lowered positions, in which the rod retainers overlie and retain a rod in the rod receptacle, and second, raised positions, in which the rod retainers are pivoted upwardly relative to the rod receptacle for releasing the rod from the rod receptacle.

According to another aspect of the present invention, there is provided a fishing rod holder comprising an elongate, upwardly open fishing rod receptacle having upwardly divergent opposite sides with a pair of the elongate fishing rod retainers on the fishing rod receptacle. The fishing rod retainers extend side-by-side along the fishing rod receptacle and form therewith an elongate passage for accommodating a portion of a fishing rod in first positions of the fishing rod retainers. Pivot connections at one end of the fishing rod receptacle, between the opposite sides of the fishing rod receptacle and respective ones of the fishing rod retainers, have pivot axes which converge upwardly and inwardly of the opposite sides.

The upward and inward convergence of the pivot axes allows pivotation of opposite ends of the fishing rod retainers upwardly and away from one another from the first positions to second positions, in which the fishing rod retainers are spread apart from one another to release the fishing rod.

BRIEF DESCRIPTION OF THE DRAWINGS

The invention will be more readily understood from the following description of a preferred embodiment thereof of given, by way of example, with a reference to the accompanying drawings, in which.

DESCRIPTION OF THE PREFERRED EMBODIMENT

Figure 1:
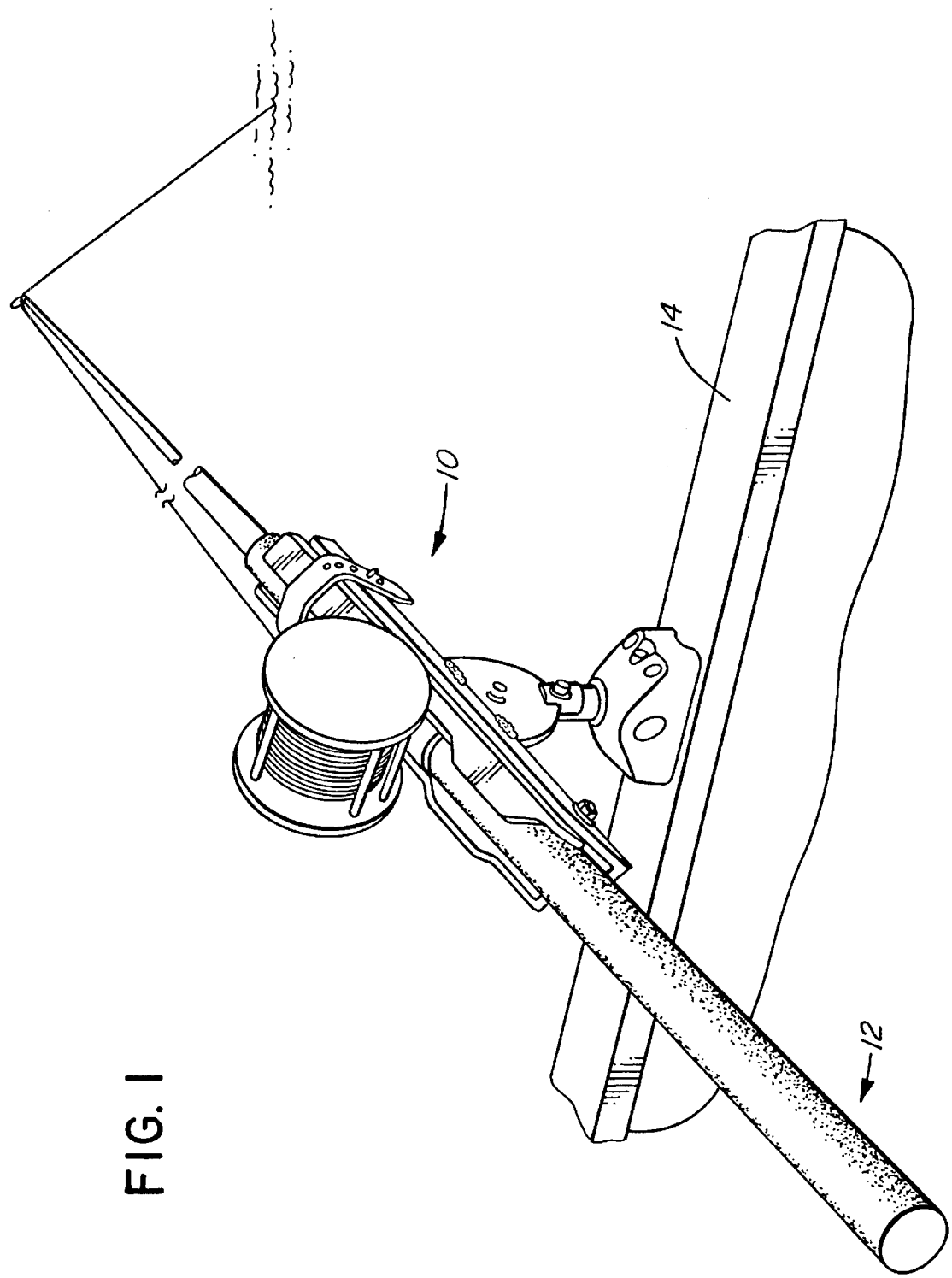
FIG. 1 shows a view in perspective on a fishing rod mounted in a fishing rod holder which, in turn, is mounted on the side of a boat.

In FIG. 1 of the accompanying drawings, there is shown a fishing rod holder, which is indicated generally by reference numeral 10 and which is supporting a fishing rod, indicated generally by reference numeral 12, on the side 14 of a boat.

Figure 2:
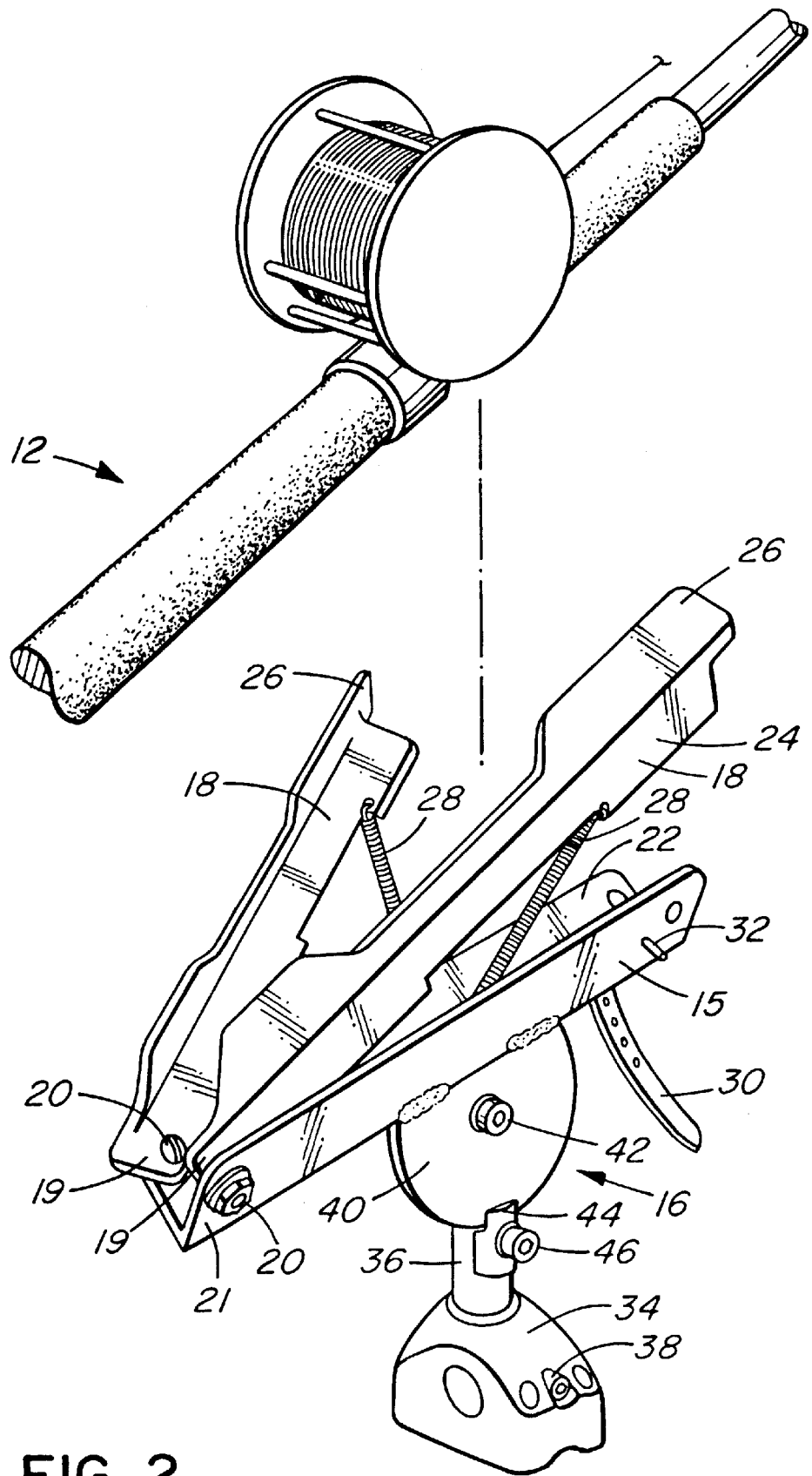
FIG. 2 shows a broken-away view in perspective of a portion of the fishing rod being withdrawn from the fishing rod holder.
Figure 3:
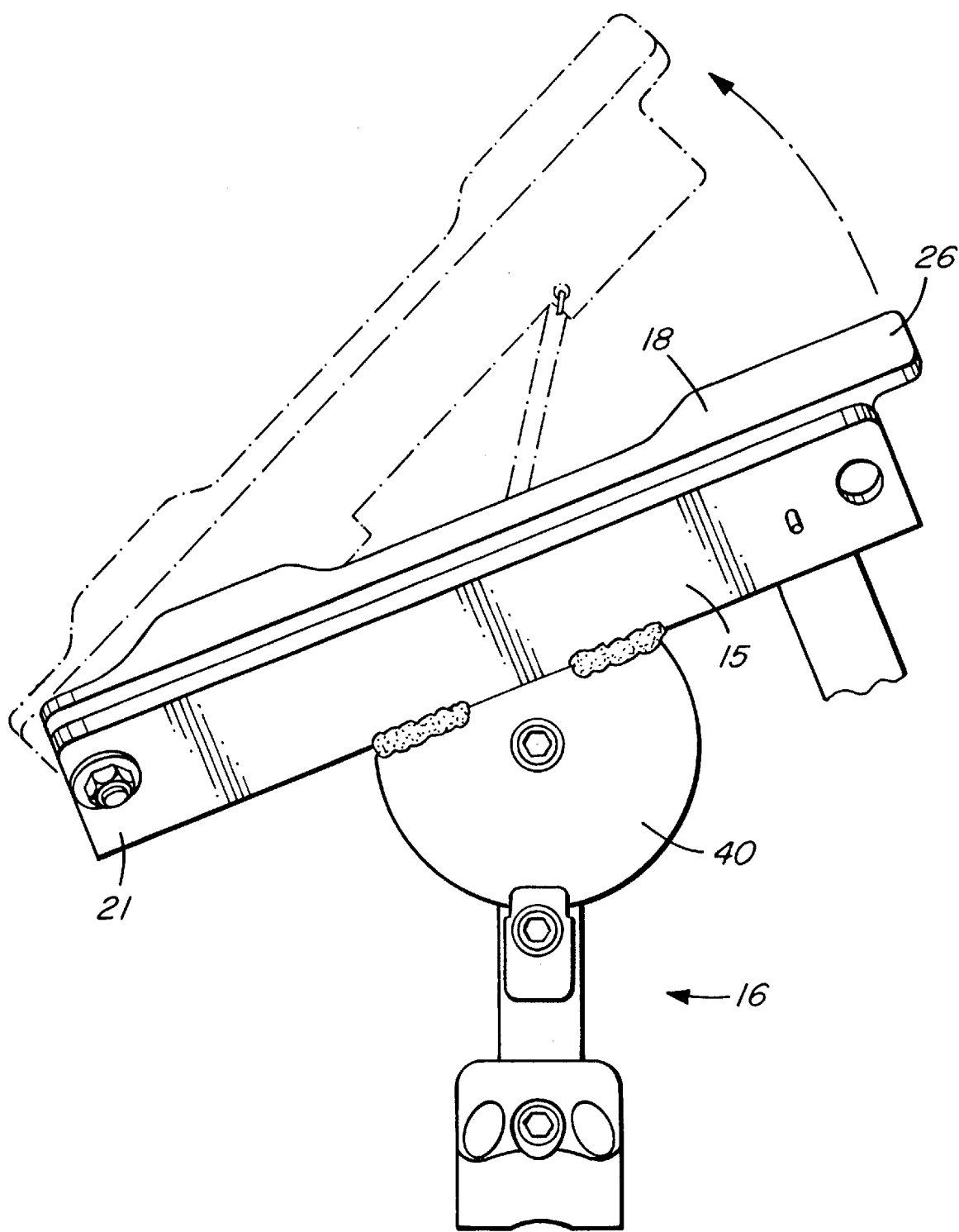
FIG. 3 shows a view in side elevation of the fishing rod holder of FIGS. 1 and 2.
Figure 4:
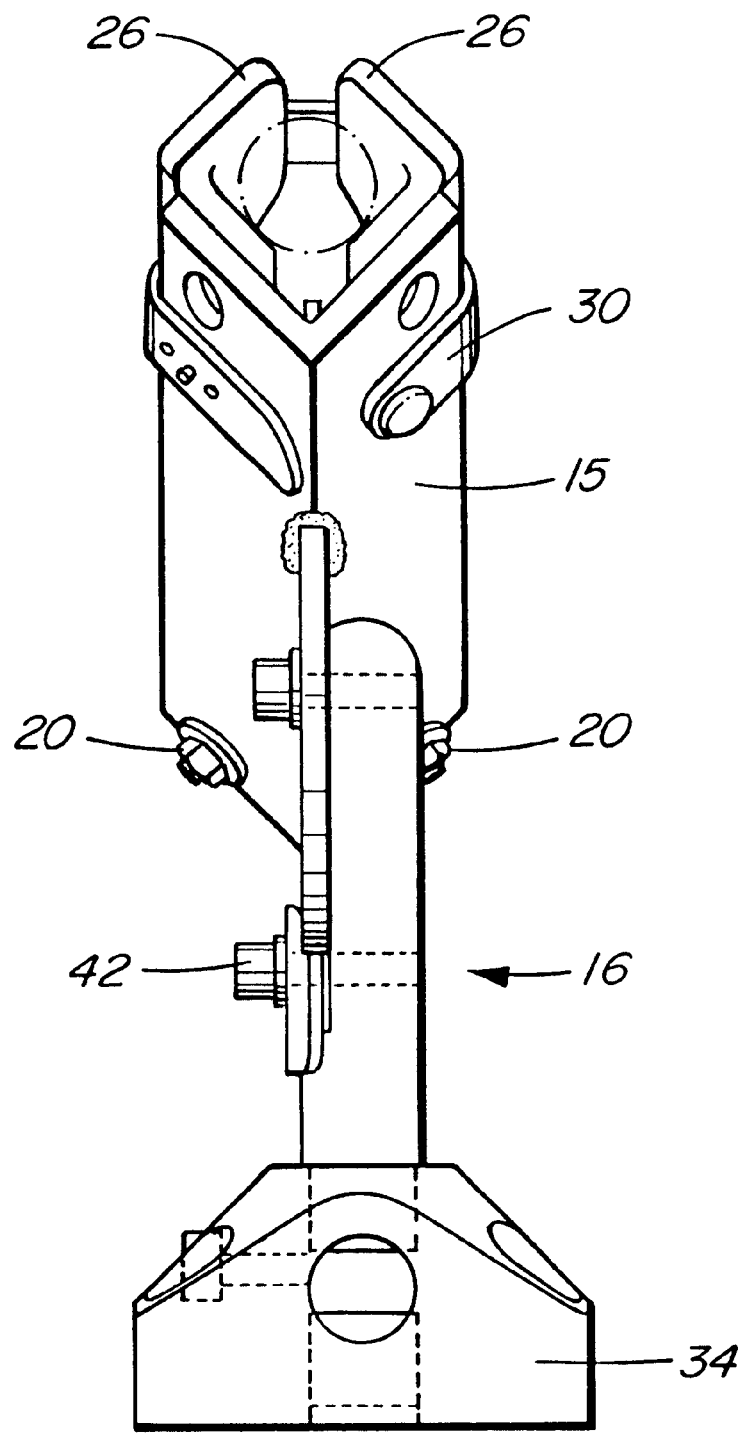
FIG. 4 shows a view in front elevation of the fishing rod holder of FIGS. 1 through 3.

The fishing rod holder 10, which is shown in greater detail in FIGS. 2 through 4, includes a fishing rod receptacle 15 in the form of an upwardly open channel member of the Vee-shaped cross-section, which is mounted on a support indicated generally by reference numeral 16.

A pair of fishing rod retainers 18 are mounted on the fishing rod receptacle 15 and, more particularly, are each connected at one end 19, by means of a respective pivot connection 20, to one end 21 of the fishing rod receptacle 15.

Figure 5:
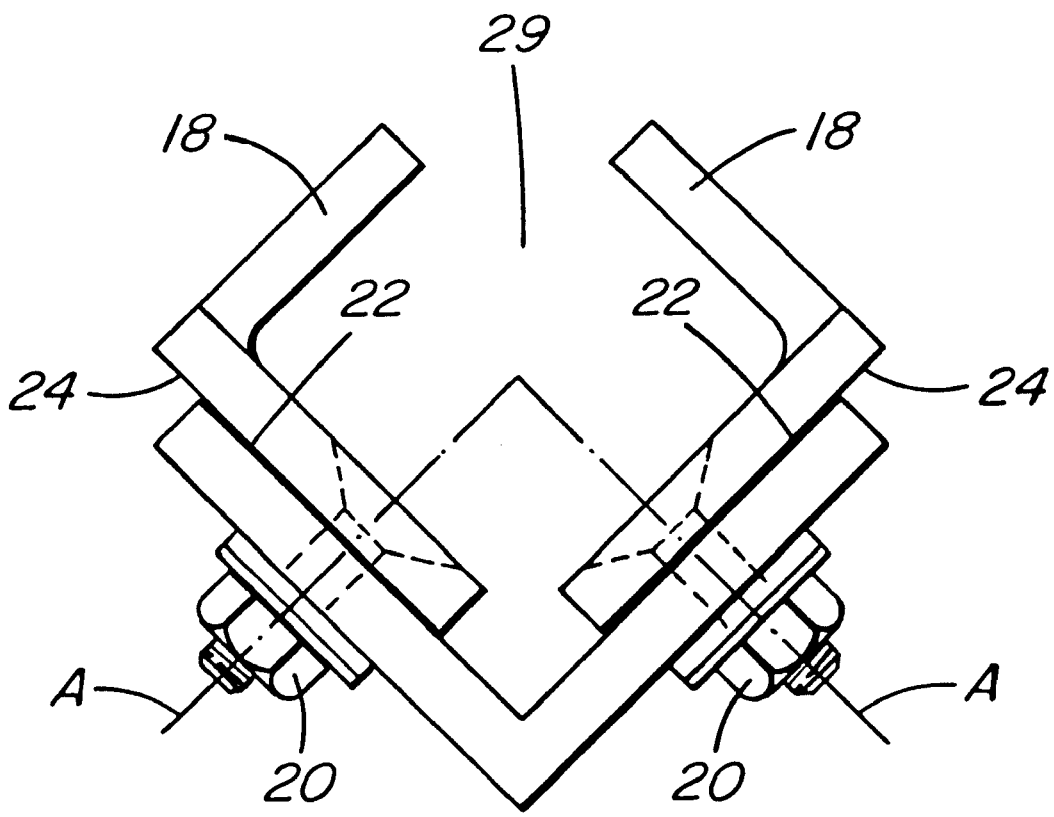
FIG. 5 shows a view in end elevation of parts of the fishing rod holder of FIGS. 1 through 4.

The fishing rod receptacle 15 has downwardly convergent inner surfaces 22, and the pivot connections 20 have pivot axes A which extend at right angles to the surfaces 22 and which converge upwardly and inwardly of the fishing rod receptacle 15, as shown in greater detail in FIG. 5.

The fishing rod retainers 18 have shapes which are mirror images of one another and which are of Vee-shaped cross-section, the fishing rod retainers 18 having outer flat surfaces 24 which are opposed to and parallel to the inner surfaces 22 of the fishing rod receptacle 15.

The fishing rod retainers 18 are pivotable upwardly and downwardly about the axes A of the pivot connections 20 between first, lowered positions, in which the fishing rod retainers 18 are shown in FIGS. 1, 4 and 5 and, in full lines, in FIG. 3, and second, raised positions, in which the fishing rod retainers 18 are angled apart from one another as shown in FIG. 2. Because of the upward convergence of the axes A of the pivot connections 20, the fishing rod retainers 18, particularly at ends thereof indicated by reference numerals 26, move upwardly and, also, laterally apart from one another as the fishing rod retainers 18 move upwardly from their first positions to their second positions, so that the fishing rod retainers 18 are thereby spread apart from one another as they move towards their second positions.

A pair of helical tension springs 28 connected between the fishing rod retainers 18 and the fishing rod receptacle 15 bias the fishing rod retainers 18 about the axes A of the pivot connections 20 towards the fishing rod receptacle 15, i.e. towards their first, lowered positions.

When the fishing rod retainers 18 are in their first, lowered positions, they extend parallel to one another and to the fishing rod receptacle 15 and form, together with the fishing rod receptacle 15, an elongate passage or space 29 (FIG. 5) for accommodating and holding a portion of the fishing rod 12. It has been found, in practice, that the location of the fishing rod retainers 18 in their first positions is generally sufficient to retain the fishing rod 12 in position during fishing operations. This is because the weight of the fishing rod tends to bear down on the outer end of the fishing rod receptacle 15, while the ends 19 of the fishing rod retainers 18 adjacent to the pivot connections resist upward pressure of the fishing rod 12 acting on the ends 19 of the fishing rod retainers 18.

However, if required, an additional means may be provided for retaining the fishing rod retainers 26 in their first positions and thus in position on the fishing rod 12. For example, in the present embodiment of the invention, a strap 30 is anchored at one end to one side of the fishing rod receptacle 15 and can be drawn over the tops of the ends 26 of the fishing rod retainers 18, as shown in FIGS. 1 and 4, and then secured, by engagement with a pin 32 projecting from the opposite side of the fishing rod receptacle 15. As will be apparent to those skilled in the art, the strap 30 could be replaced by any one of a number of various alternative types of fastener.

Also, in the present embodiment of the invention, the support 16 comprises a block 34 for mounting on a suitable support surface, for example on the side 14 of a boat as shown in FIG. 1; a vertical cylindrical post 36, which is adjustably rotatable in the block 34 about a vertical axis and which can be locked in position by means of a securement screw 38; a segmental circular plate 40, which is adjustably rotatable about a horizontal pivot 42 on the post 36; and a clamp 44, which can be drawn into clamping engagement with the plate 40 by adjustment of an adjustment screw 46. By these means, the fishing rod holder 10 can be adjusted in position horizontally and vertically. However, as will also be apparent to those skilled in the art, other types of adjustable support could be utilized for mounting the fishing rod holder 10.

When the fishing rod holder 10 is in use, and when it is desired to remove the fishing rod 12 from the fishing rod holder 10, the strap 30 or other fastener is firstly released. The fishing rod 12 is then tilted upwardly, so that the fishing rod 12 presses against the outer ends 26 of the fishing rod retainers 18. The fishing rod retainers 18 are thereby urged upwardly towards their second positions, which spreads them apart sufficiently to enable the fishing rod 12 to be withdrawn upwardly from between the fishing rod retainers 18. The fishing rod holder 10 thus opens effortlessly and smoothly, in an automatic manner.

In this way, the fishing rod 12 can be very easily and smoothly removed from the fishing rod holder 10 in a gentle manner which does not disturb the presentation of bait, on the fishing line of the fishing rod 12, during a fishing interaction, i.e. during a bite.

On the other hand, when the fishing rod 12 is retained in the fishing rod holder 10, the fishing rod 12 is securely held.

Various modifications may be made in the above-described embodiment of the present invention within the scope of the present invention. For example, while the fishing rod receptacle 15 and the fishing rod retainers 18 of the above-described embodiment of the invention are of the Vee-shaped cross-section, with flat opposed surfaces 22 and 24, it is alternatively possible to form these components with arcuate opposed surfaces. Also, the springs 28 may be replaced by torsion springs, compression springs or flat springs acting to urge the fishing rod retainers 18 towards their lowered positions relative to the fishing rod receptacle 15. The fishing rod retainers 18 and the fishing rod receptacle 15, in the present embodiment of the invention, are made of aluminum but may alternatively be made, for example, of molded plastic material, steel or any other material of sufficient strength and corrosion resistance.

What is claimed is:

1. A fishing rod holder, comprising:
   an elongate, upwardly open fishing rod receptacle, said fishing rod receptacle having first and second ends;
   a support for said fishing rod receptacle; and
   a pair of elongate fishing rod retainers on said fishing rod receptacle;
   said fishing rod retainers having first and second ends;
   pivot connections between said first end of said fishing rod receptacle and said first ends of said fishing rod retainers;
   said pivot connections having pivot axes which converge upwardly; and
   said fishing rod retainers being pivotable about said pivot axes between first positions in which said fishing rod retainers extend parallel to one another and to the fishing rod receptacle and form therewith an elongate space for accommodating and holding a portion of a fishing rod and second positions in which said fishing rod retainers are angled apart from one another, with said second ends of said fishing rod retainer moved upwardly and laterally apart, to release said fishing rod from said fishing rod receptacle.

2. A fishing rod holder as claimed in claim 1, including means for releasably retaining said fishing rod retainers in their first positions.

3. A fishing rod holder as claimed in claim 1, including a fastener on said fishing rod receptacle for fastening said fishing rod retainers in their first positions.

4. A fishing rod holder as claimed in claim 1, including springs biasing said fishing rod retainers towards their first positions.

5. A fishing rod holder as claimed in claim 1, wherein said fishing rod receptacle has downwardly convergent flat opposite inner surfaces and said pivot connections have pivot axes extending at right angles to said inner surfaces, and wherein said fishing rod retainers have flat outer surfaces opposed to and parallel to said inner surfaces.

6. A fishing rod holder, comprising:
   an elongate upwardly open fishing rod receptacle;
   said fishing rod receptacle having upwardly divergent flat opposite inner surfaces;
   a pair of elongate fishing rod retainers on said fishing rod receptacle;
   said fishing rod retainers extending side-by-side along said fishing rod receptacle and forming therewith an elongate space for accommodating a portion of a fishing rod in a first position of said fishing rod retainers; and
   pivot connections at one end of said fishing rod receptacle between said fishing rod receptacle and ends of said fishing rod retainers;
   said pivot connections having pivot axes which converge upwardly at right angles to said inner surfaces and said fishing rod retainers being pivotable about said pivot axes from the first positions into second positions in which said fishing rod retainers are positioned to release the fishing rod from the fishing rod receptacle.

7. A fishing rod holder as claimed in claim 6, wherein said fishing rod retainers are channel members of Vee-shaped cross-section and have flat outer surfaces parallel to and opposed to respective ones of said inner surfaces of said fishing rod receptacle.

8. A fishing rod holder as claimed in claim 6, further comprising springs biasing said fishing rod retainers towards their first positions.

9. A fishing rod holder as claimed in claim 6, including fasteners for releasably retaining said fishing rod retainers in their first positions.

* * * * *